(12) United States Patent
Matsumoto

(10) Patent No.: US 6,497,429 B2
(45) Date of Patent: Dec. 24, 2002

(54) AIRBAG APPARATUS

(75) Inventor: Yoshinobu Matsumoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/941,719

(22) Filed: Aug. 30, 2001

(65) Prior Publication Data

US 2002/0027338 A1 Mar. 7, 2002

(30) Foreign Application Priority Data

Sep. 4, 2000 (JP) .......................... 2000-267142

(51) Int. Cl.[7] .............................. B60R 21/22
(52) U.S. Cl. ........................ 280/730.2; 280/728.2; 280/736
(58) Field of Search .................. 280/728.2, 730.1, 280/730.2, 732, 736, 741

(56) References Cited

U.S. PATENT DOCUMENTS 5,094,475 A * 3/1992 Olsson et al. ............... 280/736
5,667,241 A * 9/1997 Bunker et al. ............ 280/730.2
5,857,696 A * 1/1999 Inoue et al. .............. 280/728.2
6,224,089 B1 * 5/2001 Uchiyama et al. ........ 280/728.2
6,293,581 B1 * 9/2001 Saita et al. .............. 280/730.2

FOREIGN PATENT DOCUMENTS

| JP | 10-291457 | 11/1998 |
| JP | 3082140 | 8/2000 |
| WO | 96/26087 | 8/1996 |

* cited by examiner

Primary Examiner—Paul N. Dickson
Assistant Examiner—David R. Dunn
(74) Attorney, Agent, or Firm—Kanesaka & Takeuchi

(57) ABSTRACT

To provide an airbag apparatus in which the gas generator can be mounted quite easily to the gas generator mounting portion of the airbag without causing gas leakage at all. A curtain-like airbag having an elongated cylindrical gas generator mounting portion is provided on the upper side surface of the cabin for protecting the passenger of the automotive vehicle. A gas generator insertion port is provided at both ends of the gas generator mounting portion. A gas generator is inserted into the gas generator insertion port, and fastened tightly with a fastener from the outer periphery of the gas generator insertion port. The gas generator is constructed in such a manner that a casing is fitted on a hybrid inflator concentrically with a cylinder and a gas exhaust port is provided on the side peripheral surface of the casing.

5 Claims, 4 Drawing Sheets

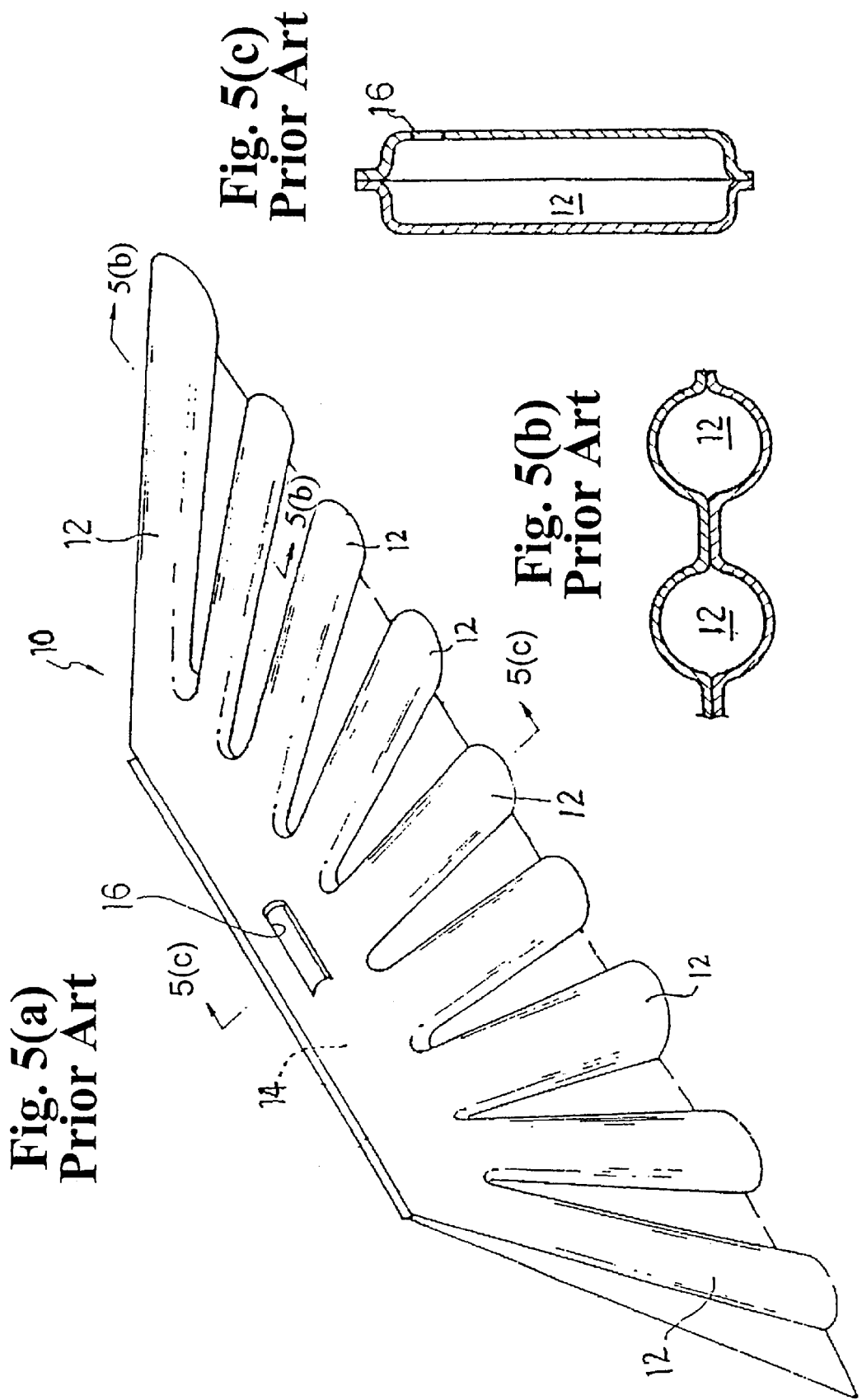

AIRBAG APPARATUS

BACKGROUND OF THE INVENTION AND RELATED ART STATEMENT

The present invention relates to an airbag apparatus for protecting passengers in the high-speed movable body such as automotive vehicles in case of collision, and more specifically, an air bag apparatus in which the connecting portion between the airbag and the gas generator is improved. Especially, the present live invention relates to an airbag apparatus suitable for applying to the airbag that deploys like a curtain along the side surface of the cabin of the automotive vehicle.

This type of protection bag for the head of the passenger in the automotive vehicle is disclosed in WO96/26087, and specifically shown in FIG. 1 and FIG. 9 therein. In this known bag, the air chamber comprises a duct portion extending along the upper edge of the bag from the end of the bag facing toward the front of the vehicle (front end) to the end facing toward the back of the vehicle (rear end), and a number of cells extending continuously downward from the duct portion. The gas generator is connected to the duct portion on the side facing toward the rear of the vehicle. The gas generator generates gas upon collision of the vehicle, and gas flows into the duct portion from the side facing toward the rear of the vehicle and deploys the cells from the cell at the rear end in a sequential order. Therefore, the cell on the front end is deployed significantly behind the cell on the rear side.

As a protection bag for the head of the passenger of the automotive vehicle in which the time difference of the deployment between the respective portions of the bag is small and is rapidly deployed as a whole, the one which is provided with a gas inlet port at the center of the bag when viewed in the fore-and-aft direction of the vehicle is proposed in Japanese Patent Application Publication No.10-291457

FIGS. 5(a)–5(c) are a bag shown in the same publication, in which FIG. 5(a) is a perspective view showing a state in which gas in introduced in the bag and deployed, and FIG. 5(b) and FIG. 5(c) are cross sectional views taken along the lines 5(b)–5(b) and 5(c)–5(c) FIG.5(a) respectively.

The bag 10 is provided with a plurality of longitudinal air chambers 12 formed by overlapping two almost fan-shaped sheets and joining the entire peripheral margin and prescribed positions in the vertical direction. The upper portions of the air chambers 12 are in communication with the upper air chamber 14. An opening 16 for supplying gas into the upper air chamber 14 is provided at the longitudinal center thereof.

In the bag 10 constructed in a manner described above, gas is supplied into the upper air chamber 14 from the opening 16 when the automotive vehicle crashes or rolls over. The supplied gas deploys the upper air chamber 14 and the longitudinal air chambers 12, and thus the bag 10 is deployed along the door window or the like.

In the Japanese Patent Application Publication No.10-291457, how the gas generator is connected to the gas inlet port 16 is not disclosed.

It is an object of the present invention to provide an airbag apparatus in which the gas generator is mounted to the gas inlet port easily and without causing gas leakage at all, and in which the airbag can be deployed smoothly as a whole.

Further objects and advantages of the invention will be apparent from the following description of the invention.

SUMMARY OF THE INVENTION

The airbag apparatus of the present invention comprises an airbag having a gas inlet port, and a gas generator for generating gas for deploying the airbag. The gas generator has a long cylindrical shape with a gas exhaust port on its side peripheral surface. The airbag has a gas generator mounting portion continuing to the gas inlet port and the gas generator mounting portion is provided with a pair of gas generator insertion ports at a prescribed distance. The gas exhaust port of the gas generator is arranged in the gas generator mounting portion in such a manner that both ends are inserted into the respective gas generator inserting ports, and the gas generator insertion port is fastened tightly from the outside by an annular fastener.

In such an airbag apparatus, the gas generator can easily be mounted by inserting the same into the gas generator insertion port and fastening tightly by an annular fastener, and no gas leakage happens at all.

Gas generated from the gas generator is supplied from the gas inlet port into the entire portion of the interior of the airbag smoothly, and thus the airbag is deployed quickly as a whole.

The pair of gas generator insertion ports are preferably formed into a cylindrical shape. The fastener is preferably formed of metal, and constructed to fasten tightly by caulking.

BRIEF DESCRIPTION OF THE DRAWINGS

FIGS. 5(a)–5(c) are views showing a conventional airbag.

DETAILED DESCRIPTION OF A PREFERRED EMBODIMENT

Figure 1:
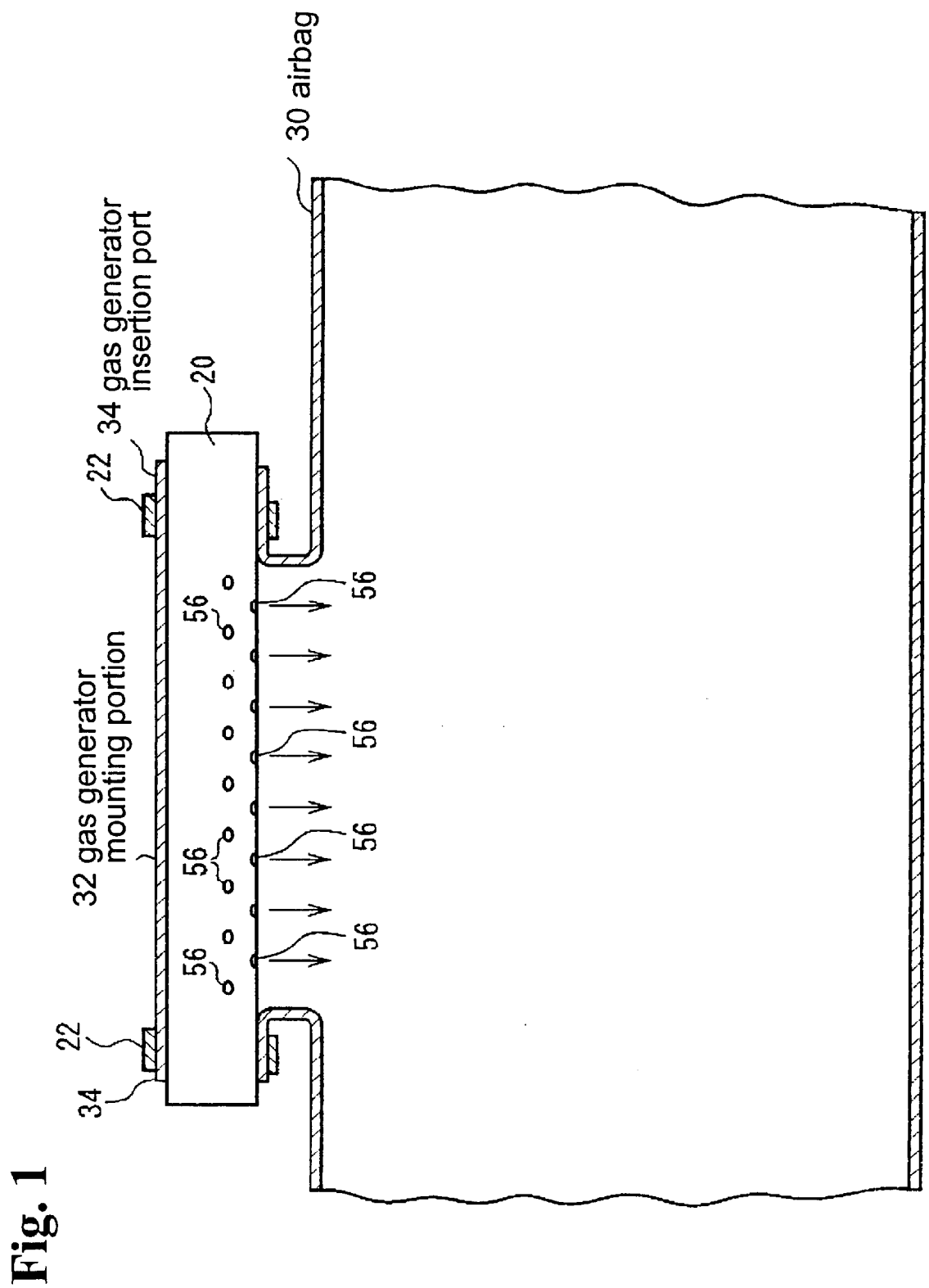
FIG. 1 is a cross sectional view of the upper center of the airbag apparatus according to an embodiment.

Referring now to the drawings, an embodiment of the present invention will be described.

Figure 2:
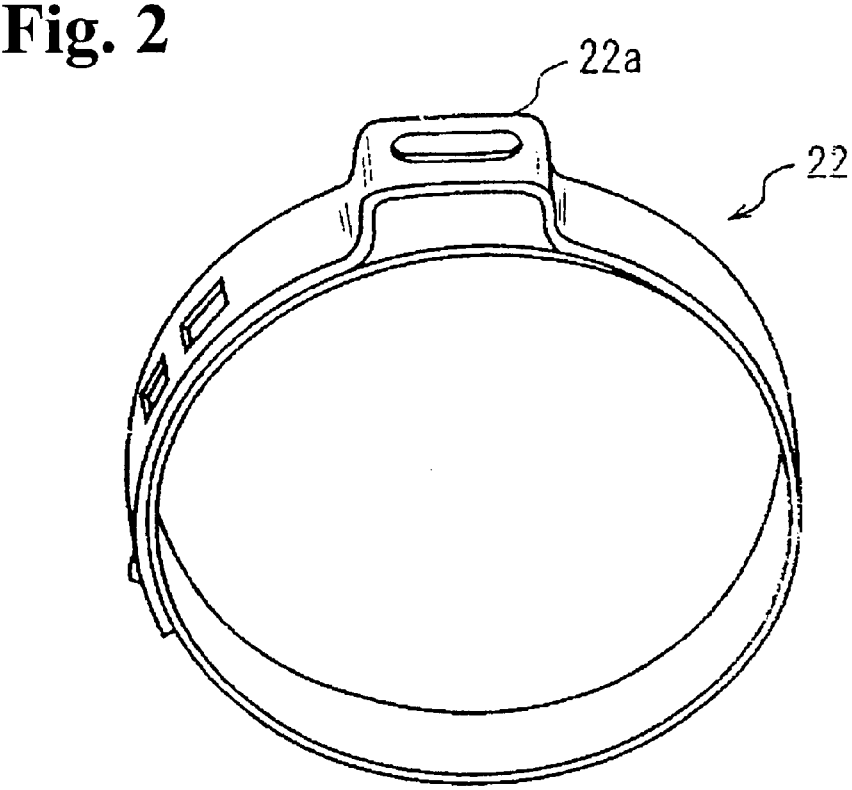
FIG. 2 is a perspective view of the fastener.
Figure 3:
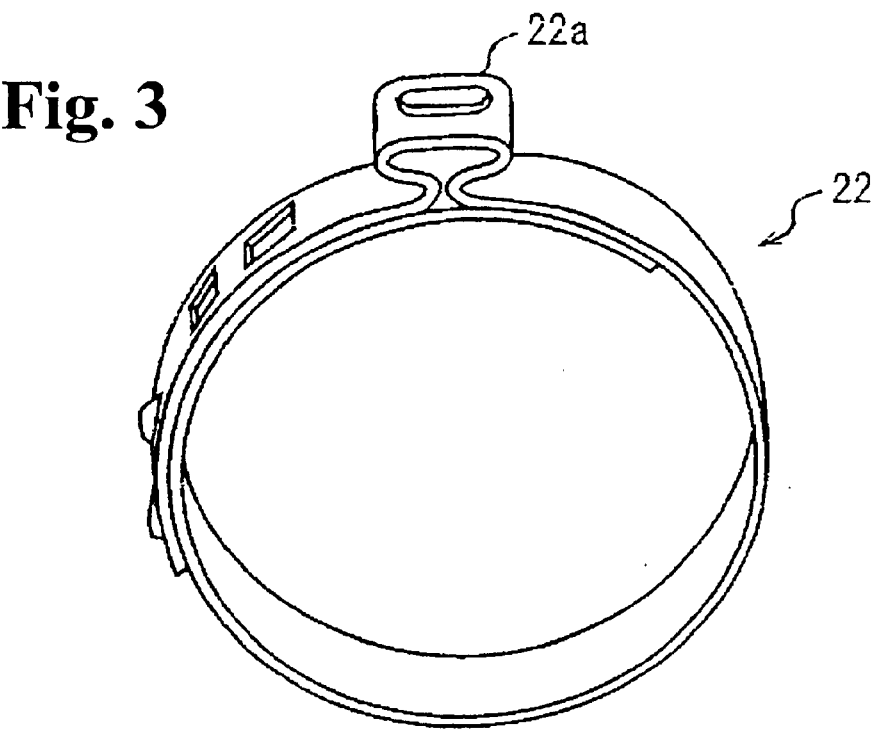
FIG. 3 is a perspective view of the fastener with the diameter reduced.
Figure 4:
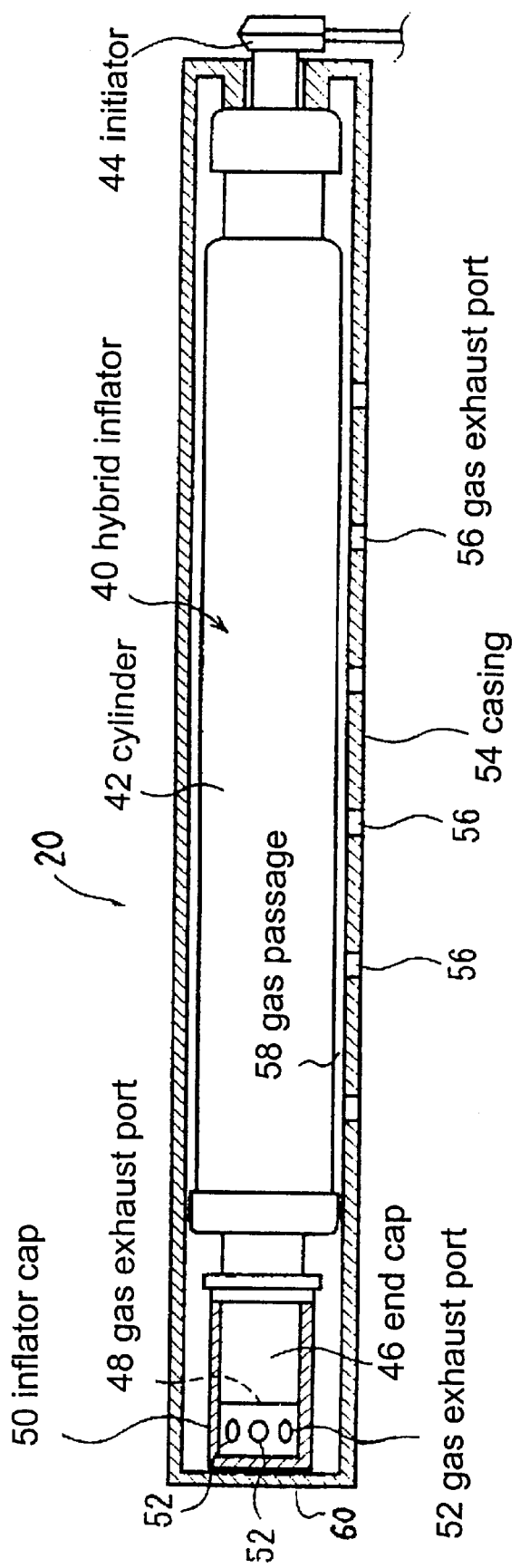
FIG. 4 is a cross sectional view of the gas generator.

FIG. 1 is a block diagram showing the upper portion of the longitudinal midsection of the airbag apparatus according to this embodiment; FIGS. 2 and 3 are perspective views of the fastener; and FIG. 4 is a cross sectional view of the gas generator.

As shown in FIG. 1, a curtain-like air bag 30 having an elongated cylindrical gas generator mounting portion 32 is mounted on the upper side surface in the cabin (for example, along the roof side rail) for protecting the passenger in the automotive vehicle. The mounting portion 32 is provided near the longitudinal midsection (when viewed in the fore-and-aft direction) of the airbag 30.

The cylindrical gas generator mounting portion 32 is provided with gas generator insertion ports 34 at both ends thereof. The gas generator 20 is inserted through the gas generator insertion port 34 and fastened tightly with fasteners 22 from the outer peripheral side of the gas generator insertion ports 34.

The fastener 22 is formed of metal, and has a looped projecting portion 22a as shown in FIG. 2. By holding and deforming the projecting portion 22a as shown in FIG. 3, the fastener 22 is decreased in diameter and tightly fastens the gas generator insertion port 34 from the outside. Accordingly, the gas generator 20 is quite easily and stably fixed into the gas generator insertion port 34, and gas leakage from the gas generator insertion port 34 is prevented.

Referring now to FIG. 4, the structure of the gas generator 20 will be described. The gas generator 20 is constructed of a hybrid inflator 40 stored in a cylindrical casing 54.

The hybrid inflator 40 is constructed in such a manner that propellant and high-pressure gas are filled in the pressure resistant cylinder 42, and an initiator 44 is mounted at one end of the cylinder 42, and a gas exhaust port 48 is provided on the tip surface of the end cap 46 mounted at the other end.

A cylindrical cup shaped inflator cap 50 is fitted on the end cap 46, and gas exhaust ports 52 are provided on the side peripheral surface of the inflator cap 50.

The cylindrical casing 54 is fitted on the hybrid inflator 40 concentrically with the cylinder 42, and gas exhaust ports 56 are provided on the side peripheral surface of the casing 54.

A clearance is defined between the inner peripheral surface of the casing 54 and the outer peripheral surface of the cylinder 42. This clearance is a gas passage 58. The inflator cap 50 abuts against the end portion 60 of the casing 54 shown at the left end of the figure.

The gas generator 20 is mounted to the gas generator mounting portion 32 in such a manner that the gas exhaust ports 56 are disposed in the gas generator mounting portion 32.

When the automotive vehicle crushes on its side, the initiator 44 is energized, and propellant in the cylinder 42 reacts, and gas generated by the reaction discharges through the gas exhaust port 48 together with high-pressure gas stored in the cylinder 42. The exhaust gas discharges from the gas exhaust port 52 of the inflator cap 50 in the radial direction, passes through the gas passage 58, and is blown out from the gas exhaust port 56. This gas deploys the airbag 30. The airbag 30 deploys quite smoothly as a whole because the gas discharged from the gas generator 20 is directly injected into the airbag 30, and the gas inlet port is provided near the longitudinal midsection of the airbag 30.

As described above, according to the airbag apparatus of the present invention, the gas generator can be mounted quite easily to the gas generator mounting portion of the airbag without causing gas leakage at all. According to the present invention, it is also possible to construct the airbag so as to be deployed smoothly as a whole.

While the invention has been explained with reference to the specific embodiment of the invention, the explanation is illustrative and the invention is limited only the appended claims.

What is claimed is:

1. A vehicle deployable airbag system comprising:

an inflatable airbag mounted along a roof side of a vehicle cabin and including a gas generator mounting portion having a pair of gas generator inserting ports spaced for a predetermined distance away from one another, and a gas inlet port located between the gas generator inserting ports inside the airbag, an elongated gas generator for generating gas for deploying the airbag, said gas generator including an inflator having a first gas exhaust port formed at one end thereof, an initiator attached to the other end of the inflator, and a casing substantially completely covering the inflator with a gas passage therebetween and having closed ends and a plurality of second gas exhaust ports on its peripheral surface intermediate said closed ends, said gas generator being mounted in said mounting portion such that a substantial portion of the gas generator is located inside the airbag and the closed ends project outwardly through the inserting ports to thereby eject the gas in the inflator from the second gas exhaust ports through the first gas exhaust port at the one end and the gas passage, and annular fastening means tightly fastening the airbag at each of said insertion ports to said gas generator from the outside.

2. The airbag system as defined in claim 1, wherein said pair of gas generator inserting ports is in the form of an open ended cylinder.

3. The airbag system as defined in claim 1, wherein said fastening means is in the form of a metal clamp and is fastened tightly by press-fitting.

4. The airbag system as defined in claim 1, wherein said airbag is deployed in a form of a curtain, said gas inlet port being disposed at an upper mid portion of said airbag to eject the gas downwardly when viewed in a for-and-aft direction of the vehicle.

5. The airbag system as defined in claim 4, wherein said fastening means is a ring shape metal clamp with a projecting portion therein, said projecting portion being fastened tightly by press-fitting to connect the airbag to the gas generator.

* * * * *